United States Patent [19]

Goldstein

[11] Patent Number: 5,991,057
[45] Date of Patent: Nov. 23, 1999

[54] IMAGE TRANSFORMATION OF A PICTURE BY USING A SUPERIMMPOSED HOLOGRAM

[75] Inventor: Steven G. Goldstein, Los Angeles, Calif.

[73] Assignees: Sony Corporation, Tokyo, Japan; Sony Electronics Inc., Park Ridge, N.J.

[21] Appl. No.: 08/715,051

[22] Filed: Sep. 17, 1996

[51] Int. Cl.[6] .............................. G03H 1/22; G03H 1/28; G03H 1/00; B42D 15/00
[52] U.S. Cl. ................................ 359/32; 359/1; 359/24; 283/86
[58] Field of Search ............................ 359/1, 2, 22, 24, 359/32; 283/86, 94; 352/85

[56] References Cited

U.S. PATENT DOCUMENTS

| | | | |
|---|---|---|---|
| 4,573,759 | 3/1986 | Swift | 359/32 |
| 5,184,848 | 2/1993 | Itoh et al. | 283/86 |

OTHER PUBLICATIONS

Excerpt from book entitled "Holography Marketplace 5th Edition" —Edited by Brian Kluepfel, Alan Rhody and Franz Ross, Oct. 1996.

*Primary Examiner*—Cassandra Spyrou
*Assistant Examiner*—Audrey Chang
*Attorney, Agent, or Firm*—Christopher M. Tobin; Jerry A. Miller

[57] ABSTRACT

The present invention uses a hologram superimposed on a traditional picture such as a photograph or printed picture. The hologram is more viewable at certain angle ranges than at others. This allows the hologram image, the picture or a combination of both to be seen at different angles, thus allowing different visual effects. In a preferred embodiment a pre-made multi-channel hologram is superimposed over a user's portrait photograph taken in a photo booth. The multi-channel hologram is aligned with the photograph so that by varying the viewing angle of the combined picture and hologram an interesting, entertaining or educational effect, such as transforming, or "morphing," the user's face into another face or image, is seen. For example, a portrait photograph of the user can morph into an animal's face, a skeleton, a scary beast, etc. The morphing, or transformation, effect is easily achieved by insuring that the hologram image is substantially aligned with the portrait photograph. For example, the eyes of the user's face in the portrait photograph must match up with the eyes in the multi-channel hologram. The multi-channel hologram is affixed to the photograph to produce the device. In one embodiment, a "frame" in the multi-channel hologram is blank (i.e., fully transparent) so that the photograph can be seen without obstruction at some angle. Other frames show successive phases of the morph. To view the morphing effect, the viewer merely moves the combined photo and hologram device from side to side, or up and down, so that the morphing effect is observed as the facial image is progressively obscured by images of the multi-channel hologram. This creates a visual effect of having the photograph morph, or change, into the holographic image and vice versa.

19 Claims, 5 Drawing Sheets

IMAGE TRANSFORMATION OF A PICTURE BY USING A SUPERIMMPOSED HOLOGRAM

FIELD OF THE INVENTION

This invention relates in general to holographic effects, and specifically to using a hologram to achieve an image transformation of a picture.

BACKGROUND OF THE INVENTION

A typical use for a hologram is to convey three dimensional image information. The image can be an object, collection of objects, scene, person or any visual image. Holograms can be created from optical or computer effects so that the image need not be derived from a physical object. Early holograms were intended to be viewed as a singular visual effect.

Holograms are useful as security measures. In some cases a small hologram is affixed to an object, such as a credit card. Additionally, a hologram may be embossed upon, or otherwise made integral with, a picture as in a driver's license. In both of these cases the purpose of the hologram is to ensure security. That is, the hologram is used to prevent someone from easily duplicating the credit card or driver's license. It is important in each of these cases that the hologram remain unobtrusive so as not to obscure information in the picture or on the card. In the case of the credit card, the hologram is made very small and located toward the edge of the credit card. This is desirable because it allows more of the surface of the credit card to be used for account and identification information. Where a hologram is embossed onto, or into, a driver's license the hologram is highly transparent such that its appearance is very subtle and the driver's license information and photograph can be seen through the hologram with very little distortion or obstruction.

Holograms are also important for their entertainment value. Since holograms are still relatively uncommon they provide entertainment as a curiosity or in providing the viewer with an unusual visual effect. However, a drawback with holograms is that they require much time, special equipment and expense to create. After mastering, a hologram can be more readily replicated although special equipment is still required. For this reason, holograms provided for entertainment and amusement are created from a factory and sold as ready-made curios. Because of the appeal of holograms it is desirable to create point-of-sale customized holograms or other devices exhibiting the holographic effect in a novel way.

Recently, the ability to place multiple holographic images into a multi-channel hologram and the ability to present the images one-at-a-time during the viewing of a multi-channel hologram, allows the multi-channel hologram to provide a limited degree of animation in a single object or device. For example, a multi-channel hologram of a television set can be created so that the image on the television set within the hologram can be made to animate or change as the multi-channel hologram is moved from side to side with respect to the viewer's line of sight. Such an animated three-dimensional visual effect has a high entertainment value. However, while multi-channel holograms can produce interesting animations, they are even more difficult to master than simple single-image holograms because, in addition to the mastering and replication problems of single-image holograms, animated multi-channel holograms require a great deal of care in setting up and capturing the different sequential images as separate holographic views, and in aligning the captured holographic views, or frames, as a well-coordinated animation.

Thus, it is desirable to produce a three-dimensional animated effect in a device that can be prepared in a short amount of time, such as would be popular at an entertainment venue attended by a large audience.

SUMMARY OF THE INVENTION

The present invention uses a hologram superimposed on a traditional picture such as a photograph or printed picture. In one embodiment a single hologram image is affixed onto a photograph. Since the hologram is viewable in different degrees according to the angle of viewing (and is substantially not visible at some angles), by tilting the combined hologram/picture more or less of the hologram image can be seen to obscure more or less of the picture image.

In a preferred embodiment a pre-made multi-channel hologram is superimposed over a user's portrait photograph taken, for example, in a photo booth. The multi-channel hologram is aligned with the photograph so that by varying the viewing angle of the combined picture and hologram an interesting, entertaining or educational effect, such as transforming, or "morphing," the user's face into another face or image, is seen. A portrait photograph of the user can morph into an animal's face, a skeleton, a scary beast, etc. The morphing, or transformation, effect is more striking when the hologram image is substantially aligned with the portrait photograph. For example, the eyes of the user's face in the portrait photograph should match up with eyes in the multi-channel hologram. In one embodiment, a multi-channel hologram is used where one "frame" in the multi-channel hologram is blank (i.e., fully transparent) so that the photograph can be seen without obstruction at some angle. Other frames show successive phases of the morph. To view the morphing effect, the viewer merely moves the combined photo and hologram device from side to side so that the morphing effect is observed as the facial image is progressively obscured by images of the multi-channel hologram. This creates a visual effect of the photograph morphing, or transforming, into the holographic image and vice versa.

DETAILED DESCRIPTION OF A PREFERRED EMBODIMENT

FIGS. 1A–D show a basic application of the present invention using a simple single hologram superimposed onto a photograph. In the discussion below it should be apparent that any type of image may be used rather than a photograph. For example, a drawing, printed picture or other graphic can be used. The graphic can be produced by a photochemical process, digital printer or other means.

Figure 1D:
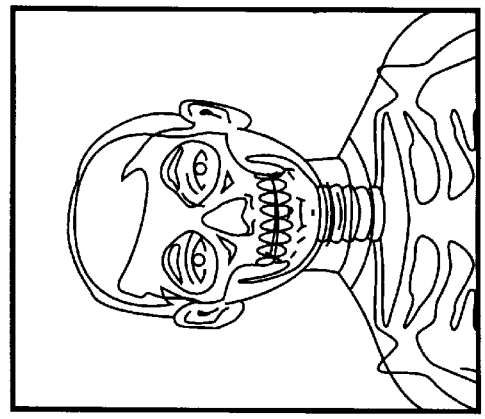
FIG. 1D shows a combined photograph and hologram.
Figure 1C:
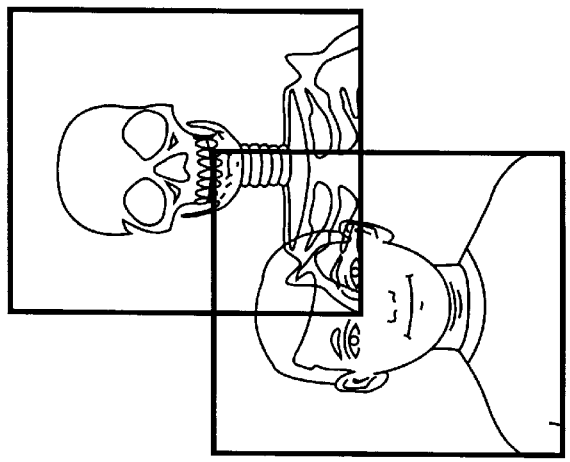
FIG. 1C shows a photograph being affixed to a hologram.
Figure 1A:
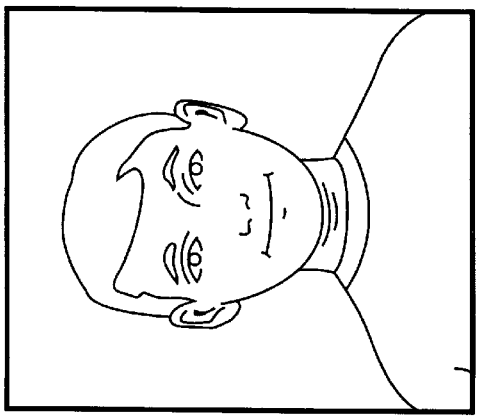
FIG. 1A is an illustration of a photograph or picture.
Figure 1B:
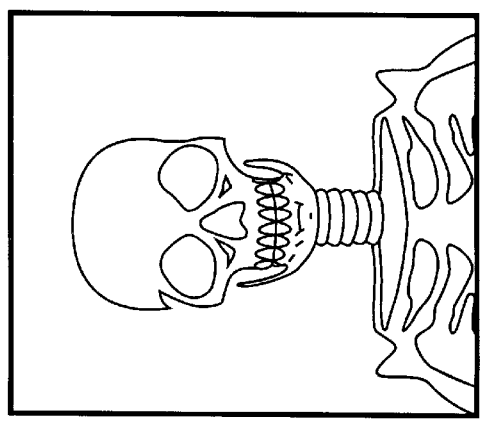
FIG. 1B is a depiction of a hologram image.

FIG. 1A shows a picture of a person, such as would be shown in a photograph or printed portrait. FIG. 1B shows a pre-made hologram of a skeleton including the skull and shoulders. Note that the dimensions of the hologram of FIG. 1B approximate the size and shape of the portrait of the person in the photograph of FIG. 1A.

FIG. 1C shows the hologram of FIG. 1B being affixed to the photograph of FIG. 1A. In a preferred embodiment the affixing is performed by an adhesive backing on the pre-made hologram. FIG. 1D shows the combined image of the hologram of FIG. 1B onto of the photograph of FIG. 1A. Thus, in FIG. 1D, both the image from photograph 1A and the image from the hologram of FIG. 1B are visible. The selection and placement of the images in the photograph and hologram is specially selected so that an interesting, educational or amusing visual effect is created.

A hologram has the property of "fading" in and out as the hologram is viewed at different angles. This is especially true when the hologram is viewed in typical conditions with multiple light sources such as a florescent or incandescent light sources in a room. As the hologram is pivoted from left to right with respect to the viewer's line of sight the intensity, or visibility, of the hologram can be made to vary so that the hologram becomes increasingly, or decreasingly, visible over the photograph. This means that, by moving the combined hologram and photograph from left to right, the effect is that the portrait changes into the skeleton and vice versa In other words, an image "transformation" (more popularly referred to as a "morphing" effect or, simply, "morph") is achieved. Moreover, since a hologram is used the image transformation effect is more striking because it is presented in three dimensions for a "3D" effect.

Even though the photograph is only a two dimensional image, the effect of overlaying a hologram with a similar shape substantially aligned with the photograph image creates an overall image which the viewer perceives as substantially three dimensional in nature. In some cases the photograph image may appear to "float" in the middle of the hologram. The property of the hologram whereby the hologram increases or decreases in intensity depending on the viewing angle allows the transformation to be controlled by a viewer holding the combined photograph and hologram. This means that the degree of morphing and the speed of the morph can be controlled by the viewer.

The effect illustrated in FIGS. 1A–D can be achieved with a standard photograph which is superimposed with, e.g., a "reflective" type of hologram. The preferred embodiment uses a photo-emulsion type of reflective hologram manufactured by Polaroid Corporation. In actuality, the preferred embodiment uses a more complex multi-channel hologram discussed in detail below.

It should be apparent that many types of image transformations can be provided by the device shown in FIG. 11D. Any combination of photographic image and hologram images can be combined to produce interesting, educational or entertaining visual effects.

For example, a house can be shown in a photograph in the summer season while a hologram can be used to illustrate the same house, or other structure, in a different season such as fall or winter. With a multi-channel hologram, as discussed below, each of the seasons—fall, winter and spring—can be shown in different holograms overlayed onto the photograph of a house. Many other image effects are possible.

Figure 2:
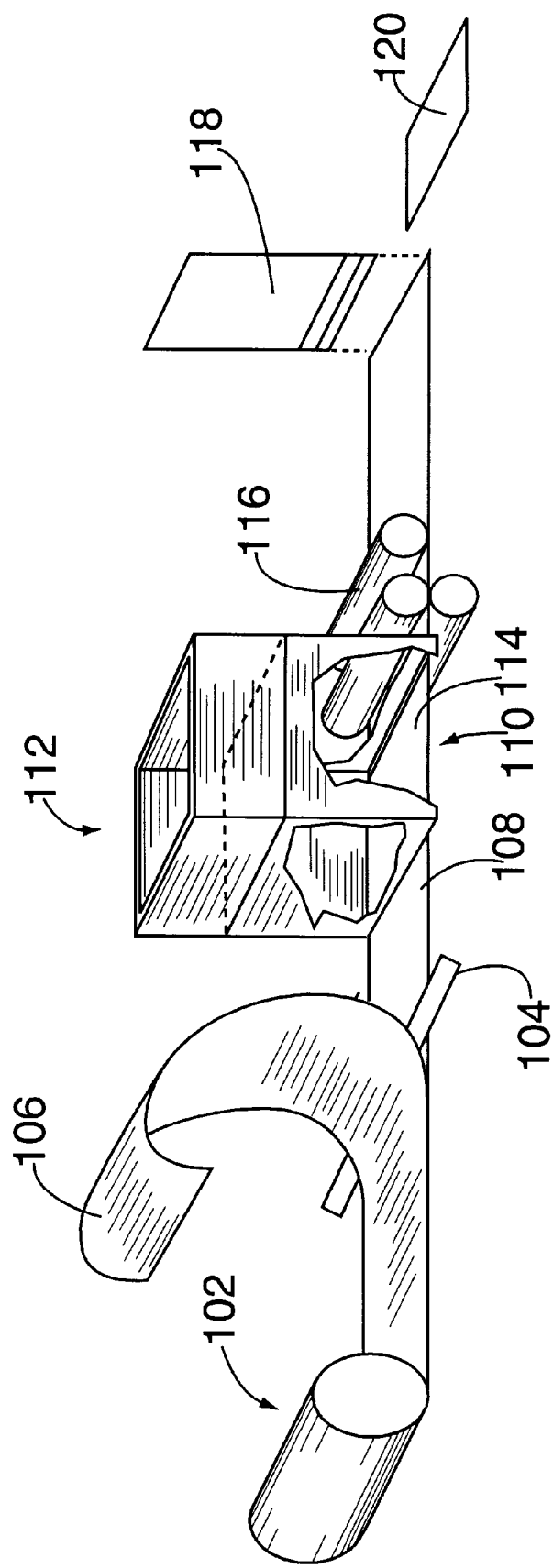
FIG. 2 illustrates a device for affixing a hologram to a photograph.

FIG. 2 illustrates a device for affixing a hologram onto a photograph. One goal of the present invention is to provide a point-of-sale system where a customized image transformation can be provided to a large number of participants, or "users." This is similar to the "photo booth" concept where users can use the photo booth to take pictures of themselves and thus preserve a happy moment in a unique way. A limitation with holograms is that they require a long time and a large amount of money to set up, master and reproduce. For example, a typical hologram may take months to prepare and master and cost on the order of $10,000. Once mastered, replication of the hologram is achieved more easily but replication still requires specialized equipment.

The present invention uses a pre-made hologram as an overlay to a standard two-dimensional photograph. In the example above in FIGS. 1A–D, the pre-made hologram would be a generic skeletal head and shoulders as shown in FIG. 1B. The customized part of the image is a photograph of the particular user such as the photograph of FIG. 1A. Since the skeleton structure is suitable for many different portraits the use of the skeleton with any given user's photograph does not detract from the visual effect. However, a problem, also addressed below in more detail, is that proper alignment of the skeleton with the photograph is necessary.

In order to obtain proper alignment of a photograph with a hologram a roll of holograms 102 with an adhesive coating and removable backing is moved toward separator 104. Separator 104 separates removable backing 106 from roll of holograms 108. A single rectangular hologram 110 is centered within cutouts a cutout of at the bottom of chute 112.

Next, a photograph taken at the point of sale is placed face down into chute 112. FIG. 2 shows a photograph 114 already placed face down onto hologram 110. Adhesive at the back of hologram 110 secures photograph 114 sufficiently so that as the sheet of holograms 108 is moved to the right towards rollers 116 photograph 114 is also carried along. Rollers 116 serve to press and more securely affix the photograph to the hologram. Finally, cutter 118 is used to cut the combined hologram 110 and photograph 114 into a combined hologram and photograph 120. The steps described in connection with FIG. 2 can be performed manually or automatically, or a combination of both. It will be apparent that many variations on the mechanisms shown in FIG. 2 for producing a combined photograph and hologram are possible.

Thus, a customer, or user, can be provided with their own photo portrait superimposed with a hologram, such as a skeleton, so that they may view the transformation of their own likeness into a skeleton hologram and vice versa.

However, as mentioned above, a problem with the present invention is that proper alignment of the hologram skeleton with the photograph portrait is critical to producing a pleasing image transformation device. Whether the affixing of the photograph to the hologram is done manually or automatically it is inevitable that there will be some variations in the size and shape of the user's photograph and, hence, the need to manipulate the orientation of the photograph with the hologram becomes important for a proper alignment. In order to make alignment easier it is desirable to use a hologram image that is substantially larger than the photographic image which will undergo the transformation effect.

Figure 3:
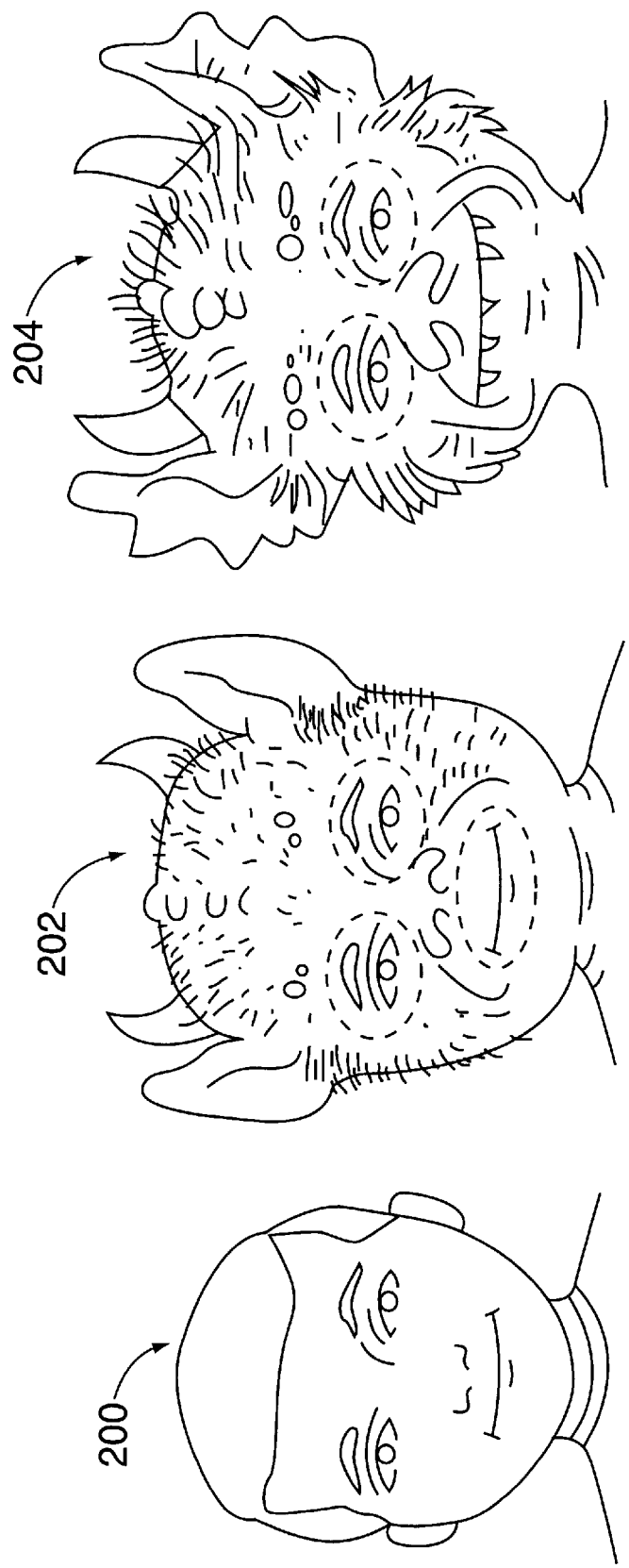
FIG. 3 shows successive images in a transformation using a multi-channel hologram

FIG. 3 shows successive images in a transformation used in a multi-channel hologram in the preferred embodiment. In FIG. 3, the desired effect is that of transforming a user's face into an animal or "beast." In the visual effect the user sees their own image 200, an intermediate image of the user's eyes and mouth with a partial creature head figure, and, finally, only the user's eyes with a complete creature head figure.

FIG. 3 actually shows three separate holograms plus one photograph. The photograph is the user's face 200. The three separate holograms are a blank hologram (which is, naturally, not visible and not shown in FIG. 3), a partial creature head and a complete creature head. By using different viewing angles the user can view either the blank, partial, or complete holograms to produce each of the three images 200, 202 and 204, shown in FIG. 3. Note that this allows more flexibility in the types of transformation or morphing that can be shown. In FIG. 3 partial creature head 202 has smaller horns, an open mouth area so that the user's mouth is shown, and less thick fur than a complete creature 204. The transformation effect thus has an intermediate stage of the partial creature 202 so that the transformation will proceed more smoothly between the complete creature 204 and the original user image 200. Note that the size of the creature heads 202 and 204 and the large areas for eyes and mouth ensure that an adequate alignment can be achieved with a minimal amount of effort.

Figure 4:
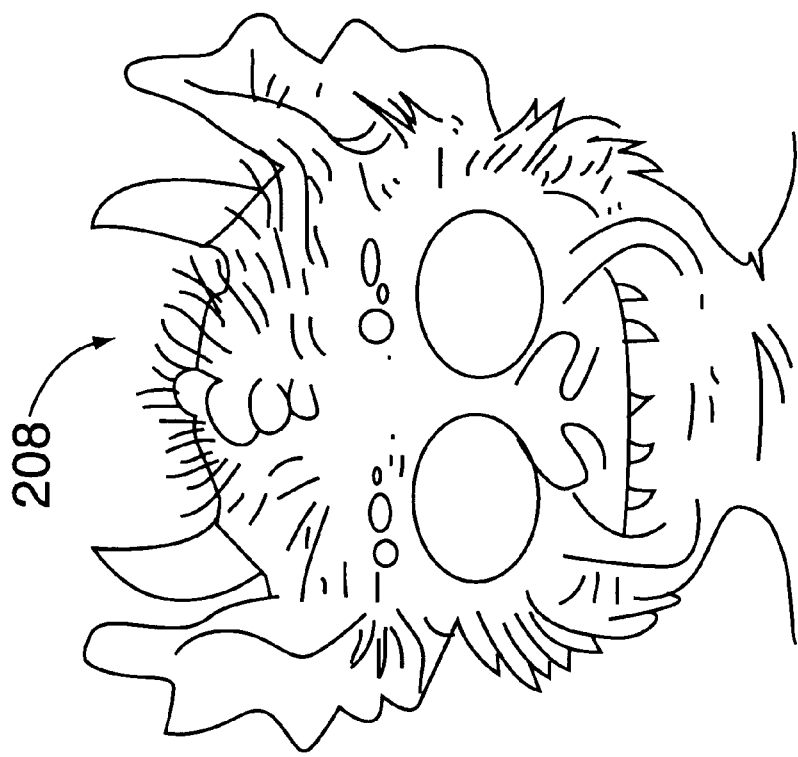
FIG. 4 shows hologram images used to create a transformation with a multi-channel hologram.
Figure 4:
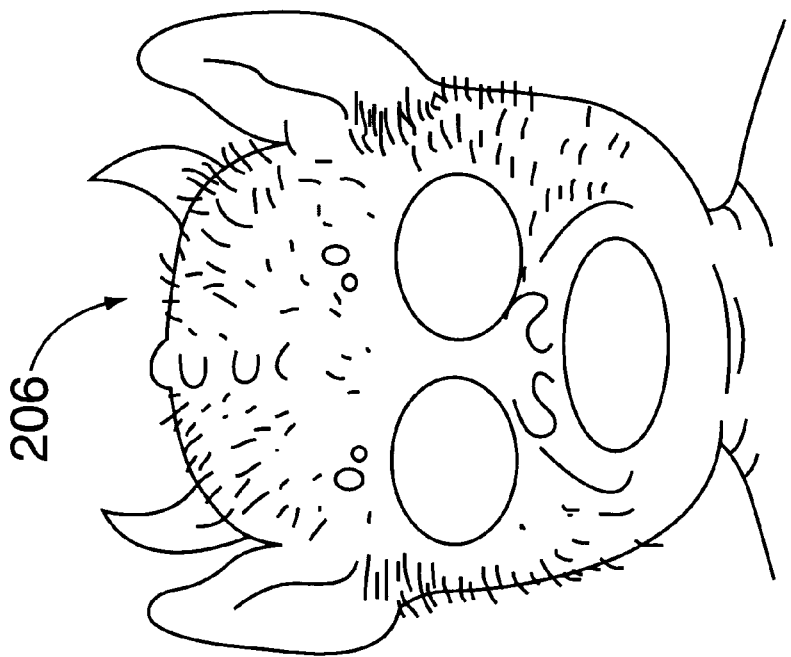

FIG. 4 shows the hologram images used to create partial creature 202 and complete creature 204 of FIG. 3. In FIG. 4, masks 206 and 208 are shown corresponding to partial creature 202 and complete creature 204 of FIG. 3. In FIG. 4, mask 206 has "blanks" for the eyes and mouth so that the eyes and mouth of the user's image from the photograph can be viewed in those spaces. To produce mask 206 a "black mask" technique is used. An acrylic model, which is normally transparent, is painted. The painted areas will show up as the holographic image. Clear portions of the mask will show up as blank areas in the hologram. In other words, clear portions of the mask will be those portions which do not reflect the laser light used to create the hologram image. The blank areas allow a viewer to see portions of the user's photographic image that lie under the blank areas. Specifically, the user's eyes and mouth will be visible in mask 206. Likewise, mask 208 will allow the user's eyes to be shown. Details on producing holograms can be found in reference books such as "Holography Marketplace," 5th Edition, Brian Kluepfel, Alan Rhody and Franz Ross; or "Practical Holography," Second Edition, by Graham Saxby.

The preferred embodiment uses a photo-polymer film to make high volume holograms. Other types of holograms can be used such as silver halide film which provides a brighter and wider viewing angle but not as good projection as photo-polymer. Holographic materials and mastering are provided by such companies as Polaroid Corporation and DuPont, Inc. Any suitable type of hologram can be used such as embossed, dichromate glass, silver halide glass plate, reflective, etc.

Figure 5:
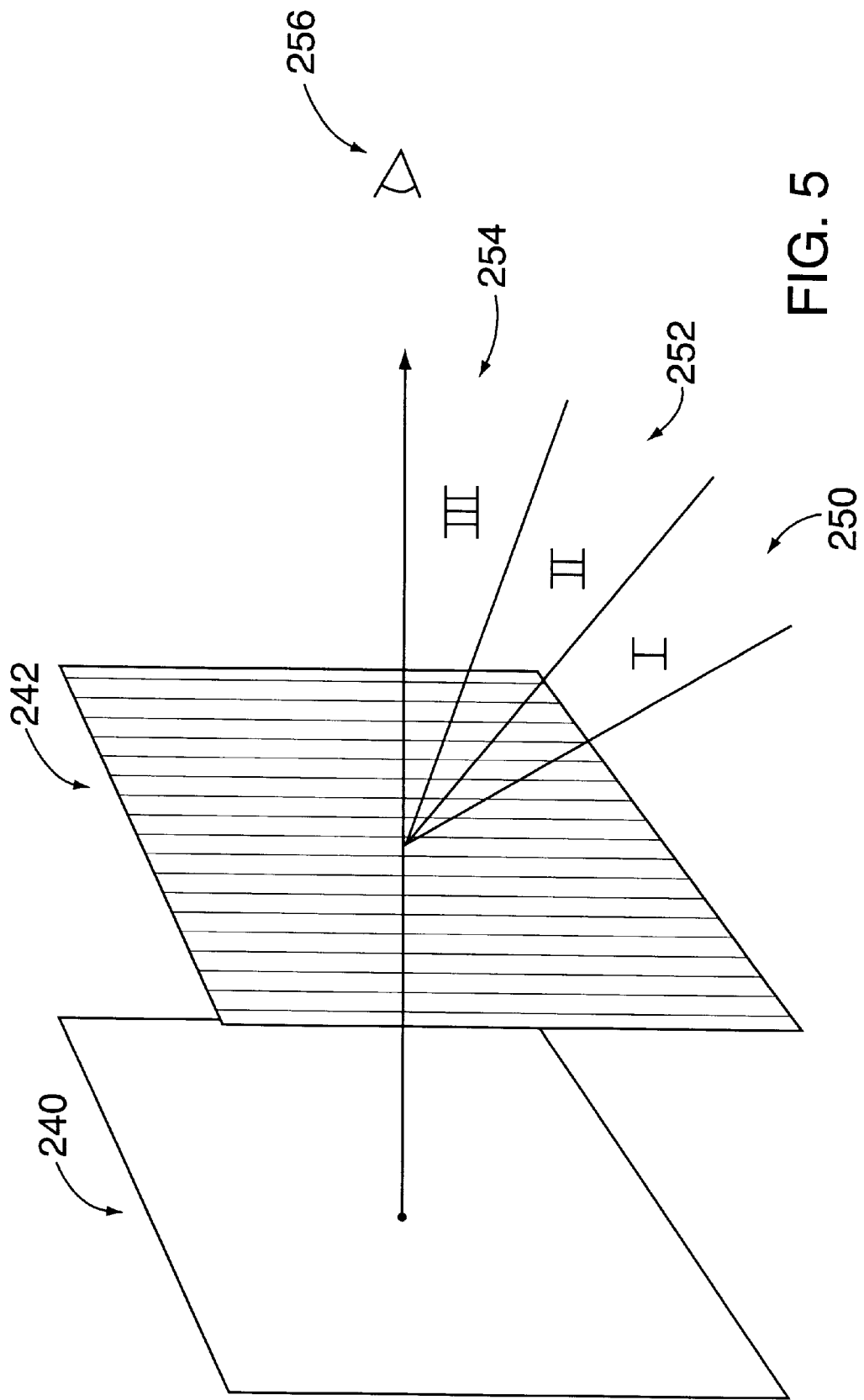
FIG. 5 illustrates the viewing angle properties of a multi-channel hologram superimposed onto a photograph.

FIG. 5 illustrates the viewing properties of a multi-channel hologram superimposed onto a photograph. In FIG. 5, photograph 240 is placed upon hologram 242. Hologram 242 is a multi-channel hologram so that multi-channel hologram images can be seen, each from a distinct angle. Using the present example described above in connection with FIGS. 3 and 4, hologram 242 is a three channel hologram. The first channel is blank, the second channel is the partial creature and the third channel is the complete creature. The first channel, I, is viewable, for example, in the range shown at 250. The second channel, II, is shown at 252 while the third channel, III, is visible in the range shown at 254. A typical viewing angle range may span 15 degrees. However, this range can vary greatly without affecting the performance of the invention. In fact, different viewing angles can add to the effect where, as in a multi-channel hologram, small angle ranges can be used to provide many different channels, or hologram images. Larger angles can be used to keep a desired hologram image in view more often than other images. Thus, as a viewer at 256 views the combined photograph 240 and hologram 242 at different angles, such as by swiveling the photograph and hologram combination from side to side, the viewer will see the image transformation as depicted in FIG. 3 proceeding from face to creature and from creature to face.

A customizable holographic image transformation device suitable for point of sale creation has been discussed above. It will be readily apparent that many variations from the specific embodiments discussed above are possible. For example, it is possible to use a computer to perform the alignment of a photograph with a pre-made hologram image. Further, the two dimensional image need not be a photograph. The two dimensional image can be a printed image or it can be created in any other manner such as by embossing, engraving, painting, drawing, etc. Also, it is not necessary to use pre-made holograms as, for example, where instant holograms may be possible in the future. The invention can be applied to different mountings such as to jewelry, watches, rings, earrings and keychains. Other applications are possible and are within the scope of the invention.

Therefore, although the invention has been discussed with respect to a specific embodiment, the scope of the invention is to be determined solely by the appended claims.

I claim:

1. A novelty device for visually transforming a pictorial subject, the novelty device comprising:

a picture that provides a pictorial image of a subject, the pictorial image having a first plurality of features;

a hologram overlaying the picture, the hologram providing a holographic image having a second plurality of features that are substantially aligned with first plurality of features;

wherein the holographic image is substantially visible and substantially obscures the pictorial image of the subject at a first viewing angle range and the holographic image is substantially less visible outside of the first viewing angle range so that varying the viewing angle from outside the first viewing angle range to within the first viewing angle range causes the pictorial image to appear to transform into the holographic image.

2. The image transformation apparatus of claim 1, wherein the picture is a photograph.

3. The image transformation apparatus of claim 1, wherein the picture is printed.

4. The image transformation apparatus of claim 1, wherein the picture is produced by machine.

5. The image transformation apparatus of claim 1, wherein the picture is drawn by hand.

6. The image transformation apparatus of claim 2, further comprising an adhesive for affixing the picture to the hologram.

7. A novelty device, comprising in combination:

a photograph including a photographic image within an image area, said photographic image having a first plurality of distinguishing features;

a hologram having a corresponding image area, said hologram overlaying and attaching to said image area of said photograph;

said hologram including a first holographic image having a second plurality of distinguishing features corresponding with said first plurality of distinguishing features;

said first and second plurality of distinguishing features being situated in alignment one above the other;

wherein the first holographic image is substantially visible and substantially obscures the photographic image at a first viewing angle range and is substantially less visible outside the first viewing angle range, whereby said photographic image appears to transform into said first holographic image when the angle at which the device is viewed is changed from outside the first viewing angle range to within the first viewing angle range.

8. The novelty device of claim 7, wherein said photograph and said hologram are bonded together with an adhesive.

9. The novelty device of claim 7, wherein said first plurality of distinguishing features include human facial features.

10. The novelty device of claim 7, wherein said second plurality of distinguishing features include human skeletal features.

11. The novelty device of claim 7, wherein said second plurality of distinguishing features include animal facial features.

12. The novelty device of claim 7, wherein said second plurality of distinguishing features include facial features of an imaginary creature.

13. The novelty device of claim 7, wherein said hologram is a multi-channel hologram including a second holographic image having a third plurality of distinguishing features corresponding with said second plurality of distinguishing features;

said second and third plurality of distinguishing features being situated in alignment one above the other;

whereby, said photographic image appears to transform into said first holographic image and said second holographic image when said device is viewed at angles wherein said photographic image is obscured by said first and second holographic images respectively.

14. A personalized composite image morphing novelty device, comprising:

a first real image layer having a first image area and a first background area, said first image area comprising one or more first discrete feature regions;

a second overlying translucent virtual image layer having a second image area and a second background area, said second image area comprising one or more second discrete feature regions;

said first and second discrete feature regions having substantially the same external dimensions, and individual said second discrete feature regions corresponding to and in substantial registration with individual said first discrete feature regions independent of the dimensions of said image areas and said background areas, said first discrete feature regions being visible in first viewing conditions, said second discrete feature regions being visible and obscuring the first discrete feature regions in second viewing conditions, whereby altering the viewing conditions from the first viewing conditions to the second viewing conditions causes the first discrete feature regions to appear to transform into the second discrete feature regions.

15. The device of claim 14, wherein said second overlying virtual image layer is a diffraction image layer, and said first real image layer is an instant photograph layer.

16. The device of claim 14, wherein said fist real image layer is a scale processed printed digital image.

17. The device of claim 16, wherein said second overlying virtual image layer is a pseudo holographic sticker layer.

18. The device of claim 14, wherein said first and second layers are bonded together by a transparent adhesive.

19. A method for visually transforming a pictorial subject, the method comprising:

providing a picture having a pictorial image of a subject, the pictorial image having a first plurality of features;

affixing a hologram to the picture, the hologram providing a holographic image with a second plurality of features that are substantially aligned with the first plurality of features, wherein the holographic image is substantially visible and substantially obscures the pictorial image of the subject at a first viewing angle range and is substantially less visible outside the first viewing angle range; and varying the viewing angle of the picture from outside the first viewing angle range to within the first viewing angle range to cause the pictorial image to appear to transform into the holographic image.

* * * * *